(12) United States Patent
Manay et al.

(10) Patent No.: US 11,493,210 B2
(45) Date of Patent: *Nov. 8, 2022

(54) INSTANT HOT WATER DELIVERY SYSTEM

(71) Applicant: Rheem Manufacturing Company, Atlanta, GA (US)

(72) Inventors: Atilhan Manay, Marietta, GA (US); Andrew David Zortman, Atlanta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,475

(22) Filed: Jun. 17, 2021

(65) Prior Publication Data

US 2021/0381697 A1    Dec. 9, 2021

Related U.S. Application Data

(63) Continuation of application No. 16/434,019, filed on Jun. 6, 2019, now Pat. No. 11,041,639.

(51) Int. Cl.
*F24D 17/00* (2022.01)
*F24D 19/10* (2006.01)

(52) U.S. Cl.
CPC ...... *F24D 17/0078* (2013.01); *F24D 19/1051* (2013.01); *F24D 2200/10* (2013.01); *F24D 2220/0257* (2013.01); *F24D 2220/06* (2013.01); *F24D 2220/08* (2013.01); *F24D 2220/10* (2013.01); *Y10T 137/6497* (2015.04)

(58) Field of Classification Search
CPC ............. F24D 17/0078; F24D 17/0089; F24D 19/1051; F24D 2220/0257; F24D 2220/06; F24D 2220/10; Y10T 137/6497
See application file for complete search history.

(56) References Cited

U.S. PATENT DOCUMENTS

| | | | | |
|---|---|---|---|---|
| 2,842,155 | A | * | 7/1958 | Peters ................ G05D 23/1333 122/13.3 |
| 2,969,451 | A | * | 1/1961 | Logan ................. F24D 17/0089 122/13.3 |
| 4,680,446 | A | * | 7/1987 | Post .................... F24D 17/0089 122/13.3 |
| 5,205,318 | A | * | 4/1993 | Massaro ............. F24D 17/0078 122/13.3 |

(Continued)

*Primary Examiner* — Kevin F Murphy
(74) *Attorney, Agent, or Firm* — Eversheds Sutherland (US) LLP

(57) ABSTRACT

An instant hot water delivery system includes a thermal storage bin that receives hot water from a water heater via a hot water supply conduit and stores the hot water therein. The thermal storage bin is disposed adjacent a point of demand to deliver the hot water instantly to the point of demand responsive to a demand. The thermal storage bin is configured to retain a thermal energy of the hot water for a prolonged period using a phase change material. When the hot water stored in the thermal storage bin cools down below a threshold temperature, the cooled down hot water is recirculated to the water heater via a cold water supply conduit using a crossover valve. The recirculation is based on thermosiphon. Fresh hot water from the water heater replaces the cooled down hot water that is displaced from the thermal storage bin.

11 Claims, 10 Drawing Sheets

(56) References Cited

U.S. PATENT DOCUMENTS

| | | | | |
|---|---|---|---|---|
| 5,622,203 A * | 4/1997 | Givler | ................ | F24D 17/0078 |
| | | | | 122/13.3 |
| 6,895,985 B2 * | 5/2005 | Popper | .................... | E03B 7/045 |
| | | | | 417/32 |
| 7,178,543 B2 * | 2/2007 | Adams | ............... | G05D 23/1919 |
| | | | | 137/15.01 |
| 7,744,007 B2 * | 6/2010 | Beagen | ................ | G05D 23/134 |
| | | | | 236/12.12 |
| 9,886,043 B2 * | 2/2018 | Yuge | .................. | F24D 19/1051 |
| 9,964,315 B1 * | 5/2018 | Ziehm | .................. | F24D 17/0078 |
| 11,041,639 B2 * | 6/2021 | Manay | ............... | F24D 17/0078 |
| 2011/0081134 A1 * | 4/2011 | Salyer | .................. | F28D 20/021 |
| | | | | 392/308 |

\* cited by examiner

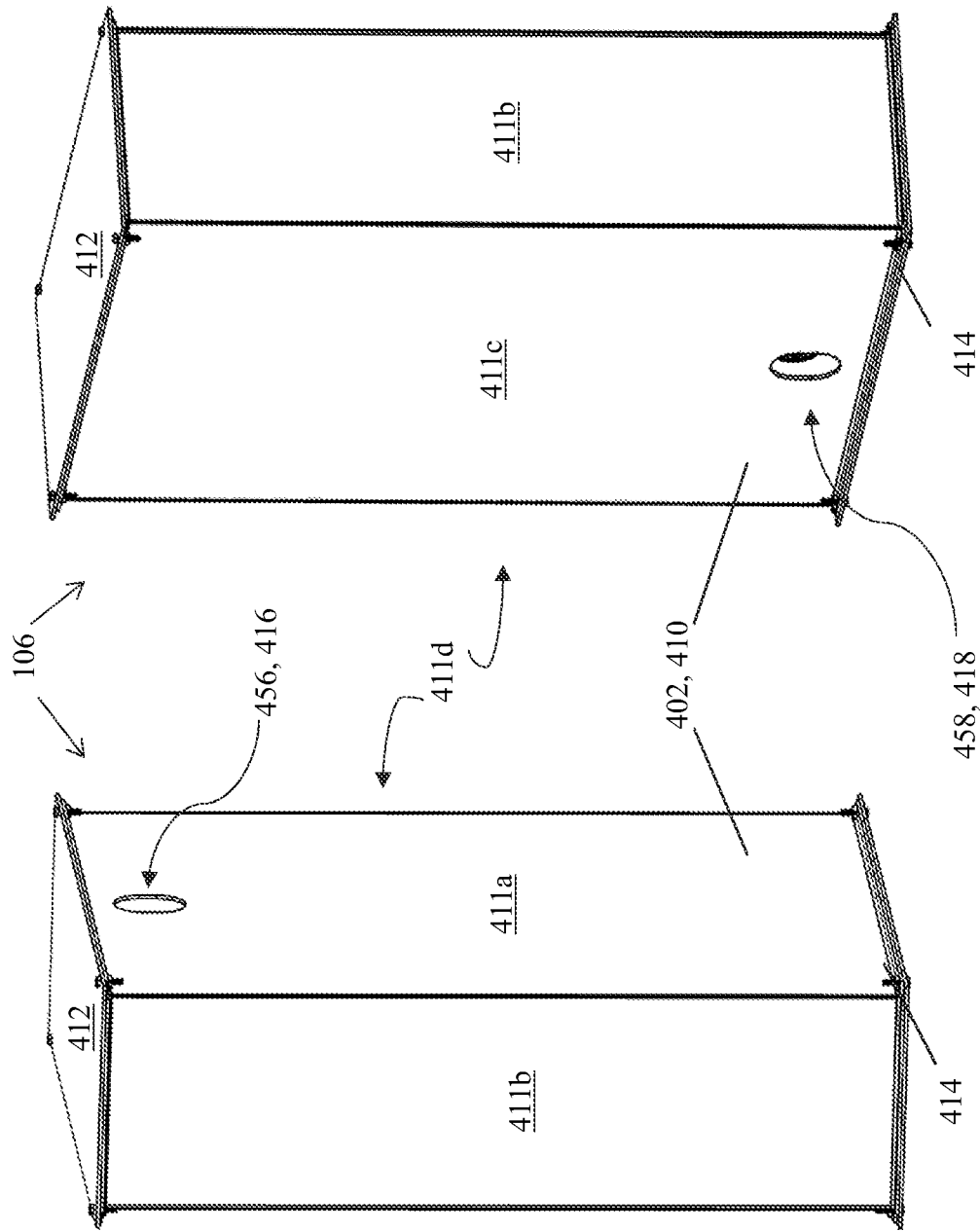

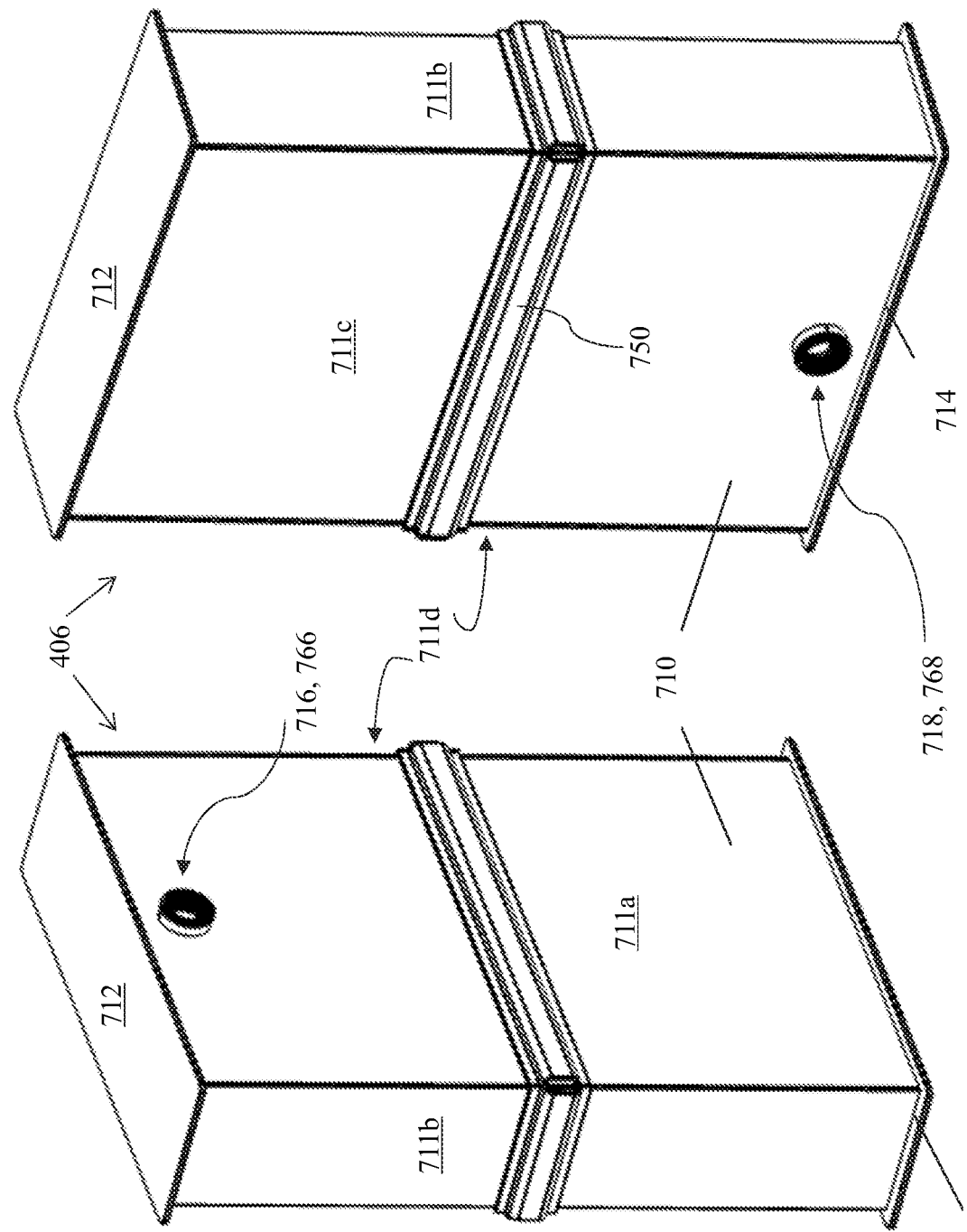

INSTANT HOT WATER DELIVERY SYSTEM

CROSS REFERENCE TO RELATED APPLICATIONS

This present application is a continuation of U.S. patent application Ser. No. 16/434,019, filed Jun. 6, 2019, the entire disclosure disclosures of which is hereby incorporated herein by reference.

TECHNICAL FIELD

The present disclosure relates generally to water distribution systems, and more particularly to an instant hot water delivery system.

BACKGROUND

Traditional hot water delivery systems include a hot water distribution pipe that distributes hot water from a water heater to different points of demand such as faucets, showers, dishwashers, etc. In said traditional hot water delivery systems, when there is no demand for the hot water and consequently no hot water is being drawn at the points of demand, the idle hot water that sits in the hot water distribution pipe cools down. Thus, when there is a reoccurrence of hot water demand at any one of the points of demand, the water initially exiting at the point of demand is the cooled down water in the hot water distribution pipe. A user will have to let the water run until the idle and cooled down water is drained from the hot water distribution pipe and fresh hot water from the water heater reaches the point of demand. Such draining of water while waiting for the fresh hot water to reach the point of demand results in wasted water which is undesirable from an environmental and water conservation perspective. Further, it may be time consuming, inconvenient, and frustrating for the user to have to wait for the cooled down water to drain before receiving hot water.

Conventional technology such as tankless water heaters, hot water recirculation units, instant hot water faucets, etc., that address said issues of the traditional hot water systems do exist. While said conventional technology does improve the water temperature, said conventional technology (e.g., tankless water heaters) may not provide instant hot water. Further, said conventional technology may not be configured for cheap, easy, and/or a plug and play installation. Instead, the installation of said conventional technology may require extensive changes to the existing plumbing and electrical systems. For example, conventional hot water recirculation units may need recirculation piping which may require extensive redesign of the existing plumbing. Further, the conventional hot water recirculation units use recirculation pumps that operate based on electrical power, thereby requiring power outlets (e.g., 220V outlets) at the installation location. Even conventional instant hot water faucets may need to be plugged to a power outlet to power the heating elements thereof. Such power outlets may not be readily available at the installation location, e.g., under the sink, in the shower, etc. So, electrical lines may need to be drawn and new power outlets may need to be installed. Accordingly, the installation of said conventional technology may require both a professional electrician and a professional plumber, which in turn makes the installation process complex, time-consuming, and cost-intensive. Such installation complexities also make said conventional technology incompatible for retrofit installations.

It is noted that this background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure is directed to an instant hot water delivery system. The instant hot water delivery system includes a thermal storage bin that defines an inner chamber that is configured to store hot water therein. The thermal storage bin includes an inlet that is fluidly coupled to a hot water outlet of a water heater; an outlet; and a heat exchanger panel that is disposed in the inner chamber such the heat exchanger panel defines flow channels within the inner chamber. The heat exchanger panel includes a phase change material that is encapsulated therein. Further, the instant hot water delivery system includes a crossover valve that is configured to recirculate the hot water from the thermal storage bin to the water heater via a cold water supply conduit based on a temperature of the hot water stored in the thermal storage bin. The crossover valve includes an input port that is fluidly coupled to the outlet of the thermal storage bin; a first output port that is fluidly coupled to a water dispensing appliance; and a second output port that is fluidly coupled to the cold water supply conduit. The cold water supply conduit is fluidly coupled to a cold water inlet of the water heater and the water dispensing appliance.

In another aspect, the present disclosure is directed to an instant hot water delivery system that includes a thermal storage bin that is disposed adjacent to a water dispensing appliance and is configured to deliver hot water instantly to the water dispensing appliance responsive to a demand for the hot water. The thermal storage bin includes an insulated inner chamber that is configured to receive hot water from a water heater and store the hot water therein. Further, the thermal storage bin includes a heat exchanger panel that is disposed in the insulated inner chamber. The heat exchanger panel encapsulates a phase change material that is configured to minimize a heat dissipation of the hot water stored in the insulated inner chamber. Furthermore, the thermal storage bin includes an inlet and an outlet that are in fluid communication with the insulated inner chamber. The inlet is coupled to a hot water output of the water heater. The outlet is coupled to a crossover valve that is configured to: (a) recirculate the hot water that is stored in the insulated inner chamber to the water heater via a cold water supply conduit when the hot water cools down below a threshold temperature; and (b) deliver the hot water to the water dispensing appliance when a temperature of the hot water is greater than or equal to the threshold temperature and responsive to the demand for the hot water from the water dispensing appliance.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 4 and 5 illustrate different perspective views of an example thermal storage bin of the example hot water delivery systems of FIGS. 1-3, in accordance with example embodiments of the present disclosure;

FIGS. 7 and 8 illustrate different perspective views of an example inner container of the thermal storage bin, in accordance with example embodiments of the present disclosure;

Figure 1:
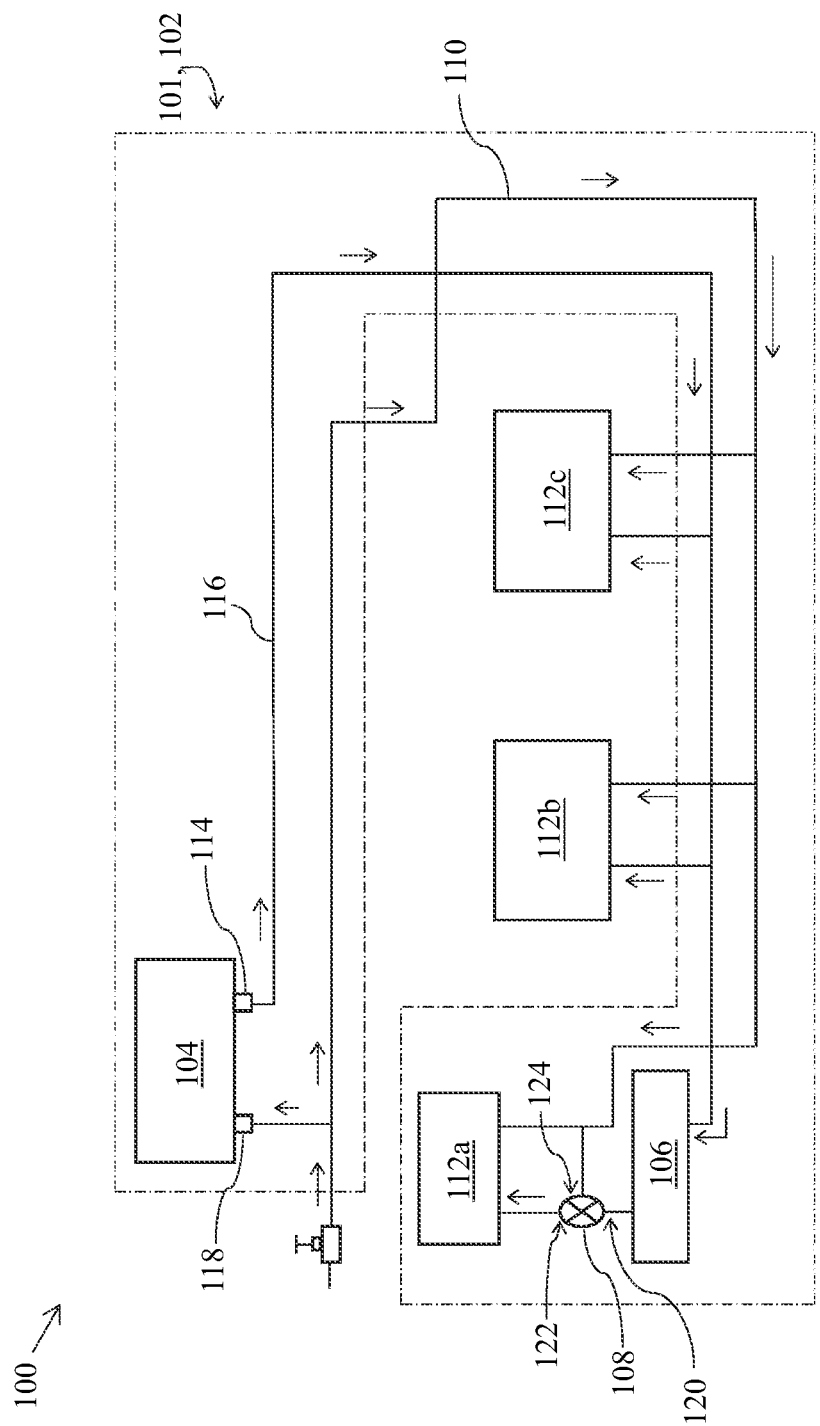
FIG. 1 illustrates a schematic view of an example instant hot water delivery system in a hot water delivery mode of operation, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes an example instant hot water delivery system that is configured to deliver hot water instantly to a point of demand from a thermal storage bin that stores hot water and uses phase change material for prolonged retention of the thermal energy of the hot water stored therein. The use of the thermal storage bin in the example instant hot water delivery system of the present disclosure eliminates the need for a recirculation pump, thereby eliminating the need for electrical power. As such, the example instant hot water delivery system of the present disclosure allows easy installation that only requires plumbing without the need of modifying electrical infrastructure. In other words, the example instant hot water delivery system of the present disclosure provides a plug and play system that is configured to deliver hot water instantly and to a point of demand without the use of electrical power.

Before discussing the example embodiments directed to the instant hot water delivery system, it may assist the reader to understand the various terms used herein by way of a general description of the terms in the following paragraphs.

The term 'instant' or 'instantly' as used herein in the context of hot water delivery may generally refer to an immediate delivery of hot water to a point of demand without any delay and/or a near immediate delivery of hot water to the point of demand with negligible delay (e.g. 1-5 seconds) upon receiving a demand for hot water from the point of demand. For example, when a user opens a faucet, hot water is made available at the faucet immediately without any delay or nearly immediately with a very negligible delay.

The term 'cold water' as used herein may generally refer to water that is not heated using a water heater before delivery to a point of demand. For example, the cold water may include the potable water that is supplied from an external water-supply utility system (e.g., public utility systems, groundwater, etc.) to the water supply system of a residential or commercial use building and is distributed to the cold water demand points of the residential or commercial building without being heated by the water heater. In one example, cold water may refer to water at ambient temperature or water at a temperature that a human user perceives as being cold or cool.

The term 'hot water' as used herein may generally refer to the water that has been heated using a water heater before delivery to a point of demand. In one example, hot water may refer to water that is at a temperature that a human user perceives as being hot. Alternatively, hot water may refer to water having a temperature that is higher than the temperature of the cold water.

The term 'point of demand' or 'demand point' as used herein may generally refer to end points or locations in a residential or commercial use building where water is dispensed from the conduits of a water supply system using any appropriate device, appliance, or fixture that may be used to dispense said water and/or control the dispensation of the water. In some embodiments, the term 'point of demand' or 'demand points' may refer to the device, appliance, or fixture that may be used to dispense said water and/or control the dispensation of the water. Said points of demand and/or devices, appliances, or fixtures that may be used to dispense and control the flow of water may include, but are not limited to, faucets, shower heads, dishwashers, etc.

The term 'thermosiphon', 'thermosiphoning', 'thermosiphon flow' or 'thermosiphonic flow' as used herein may generally refer to natural flow or circulation of water, i.e., a non-pump driven flow or circulation of water resulting from a temperature differential of the water and based on a method of passive heat exchanger. For example, the temperature difference between the hot water and the cold water in the water supply system creates the circulation of water in the water supply system without the use of a pump. In said thermosiphon flow, cold water that has a higher specific gravity (density) than hot water will sink down while the hot water rises to the top. Alternatively, hot water may flow from the hot water side of a water supply system towards the cold water side in the system.

The term 'phase change material' as used herein may generally refer to a solid-liquid phase change material. However, in some example embodiments, the phase change material may refer to a liquid-gas phase change material or a solid-solid phase change material. The solid-liquid phase change material is a material that is in a solid phase at low temperatures and a liquid phase at higher temperatures. As the phase change material is heated, its temperature increases until it reaches its melting temperature (also referred to as 'phase change temperature'). At its melting temperature, the phase change material remains in the solid phase while it absorbs a fixed amount of heat, which is generally referred to as the "latent heat of fusion." Once the phase change material absorbs the fixed amount of heat, the phase change material changes phase from solid to liquid. As heat is removed from the phase change material, its temperature decreases until the phase change material's melting temperature is reached. The phase change material remains in the liquid phase until it releases an amount of heat equal to the latent heat of fusion. As the phase change material continues to lose heat, it changes from the liquid to solid phase. The phase change material can store relatively large amounts of heat which allows hot water to be stored in a storage unit (e.g., thermal storage bin) for prolonged periods without losing much heat. That is, the phase change material reduces heat loss and promotes energy. Phase change materials may include, but are not limited to, organic compound based phase change materials such as waxes, vegetable extract, polyethylene glycol; and salt-based phase change materials such as glauber's salt or eutectic salts. Further, the phase change materials may include, but are not limited to, salt hydrates, fatty acids and esters, and various paraffins (such as octadecane).

An example instant hot water delivery system of the present disclosure may include a thermal storage bin that is disposed adjacent a point of demand and coupled to the point of demand. The thermal storage bin defines an insulated inner chamber that comprises a plurality of heat exchanger plates having phase change material disposed therein. The thermal storage bin may be configured to receive hot water from a water heater and store the hot water therein. The plurality of heat exchanger plates comprising the phase change material may be configured to retain the thermal energy of the hot water for prolonged periods. When the hot water in the thermal storage bin cools down below a threshold temperature, a crossover valve of the example instant hot water delivery system may be configured to recirculate the cooled down hot water from the thermal storage bin to the water heater via a cold water supply conduit. Further, fresh hot water from the water heater rises to the thermal storage bin to replace the cooled hot water that has been displaced therefrom. Thus, the thermal storage bin is configured to always have hot water stored therein for instant delivery to a point of demand at any given time. The crossover valve stops the recirculation when the temperature of the hot water in the thermal storage bin is equal to or above the threshold temperature. The recirculation of the cooled down hot water from the thermal storage bin to the water heater and the fresh hot water from the water heater to the thermal storage bin may be a thermal recirculation based on a thermosiphon flow mechanism, thereby not requiring a dedicated recirculation pump and electric power. Even though the instant hot water delivery system of the present disclosure is configured to operate without the use of the recirculation pump, in some examples, such as in higher elevation applications (e.g., 3+ story buildings), the instant hot water delivery system of the present disclosure may include a recirculation pump without departing from a broader scope of the present disclosure.

In some examples, the example instant hot water delivery system may additionally include a temperature switch that is coupled to the thermal storage bin, a wireless transmitter that is coupled to the temperature switch, and a wireless receiver that is coupled to the water heater. In said examples, the temperature switch, the wireless transmitter, and the wireless receiver may be configured to operate in concert to control a heating operation of the water heater based on the temperature of the hot water stored in the thermal storage bin and/or based on a position of the crossover valve.

The example instant hot water delivery system of the present disclosure improves over traditional hot water delivery systems and conventional instant hot water delivery technology in that the example instant hot water delivery system of the present disclosure uses a thermosiphon based thermal recirculation system which eliminates the need for a recirculation pump and thereby, the need for electrical power for operation. Eliminating the need for electric power for operation reduces the system energy usage compared to systems with recirculation pumps. Further, eliminating the need for electric power allows easy installation of the example instant hot water delivery system without the need of electrician work and/or any significant modifications of the electrical infrastructure. Further, the example instant hot water delivery system of the present disclosure conserves every day water usage by eliminating the need to drain idle and cooled down water in the pipes before receiving hot water. Also, the example instant hot water delivery system of the present disclosure improves user experience by making hot water available at any time instantly as soon as an appliance, such as a faucet is turned on for hot water operation.

Furthermore, the example hot water delivery system of the present disclosure reduces the amount of energy input into the recirculation of water as the example hot water delivery system of the present disclosure is designed to only maintain the temperature and heat capacity of the thermal storage bin rather than having to frequently heat up water within a non-insulated piping system. In other words, the example hot water delivery system of the present disclosure is configured to activate the thermal recirculation loop only if the temperature of the water stored in the thermal storage bin is reduced below a threshold temperature. The strong insulation properties of the thermal storage bin and the high thermal storage capability of the phase change material in the thermal storage bin reduces the heat dissipation from the thermal storage bin, thereby reducing the number of instances of hot water recirculation between the thermal storage bin and the water heater. Unlike conventional instant hot water delivery technology such as conventional integrated loop recirculation systems that constantly recirculate hot water to the water heater via the cold water supply conduits which causes hot water to be constantly present in the cold water pipes, the reduced number of instances of thermal recirculation in the example instant hot water delivery system of the present disclosure improves the user experience by reducing the amount of hot water instances in the cold water line when the user desires to use cold water from the cold water line.

Example embodiments of the instant hot water delivery system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the instant hot water delivery system of the present disclosure may be embodied in many different forms and should not be construed as limited to the embodiments set forth herein; rather, these embodiments are provided so that this disclosure will be thorough and complete, and will fully convey the scope of the technology to those appropriately skilled in the art. Further, example embodiments of the instant hot water delivery system of the present disclosure can be disposed and/or operate in water supply systems located in any type of environment (e.g., commercial use building, residential building, etc.) for any type (e.g., commercial, residential, industrial) of user. Further, the example instant hot water delivery system of the present disclosure is configured to work with all common types of hot water heaters (e.g., tankless, tank, electric, gas, hybrid, solar, etc.), thereby making the example instant hot water delivery system of the present disclosure universally and backwards compatible with all residential and/or commercial applications.

Turning now to the figures, example embodiments of an instant hot water delivery system will be described in association with FIGS. 1-12. In particular, example instant hot water delivery systems of the present disclosure will be described in connection with FIGS. 1-3; an example thermal storage bin of the example instant hot water delivery systems will be described in connection with FIGS. 4-10; and example methods of instant hot water delivery systems will be described in connection with FIGS. 11 and 12 by referring to FIGS. 1-3 as needed.

Figure 2:
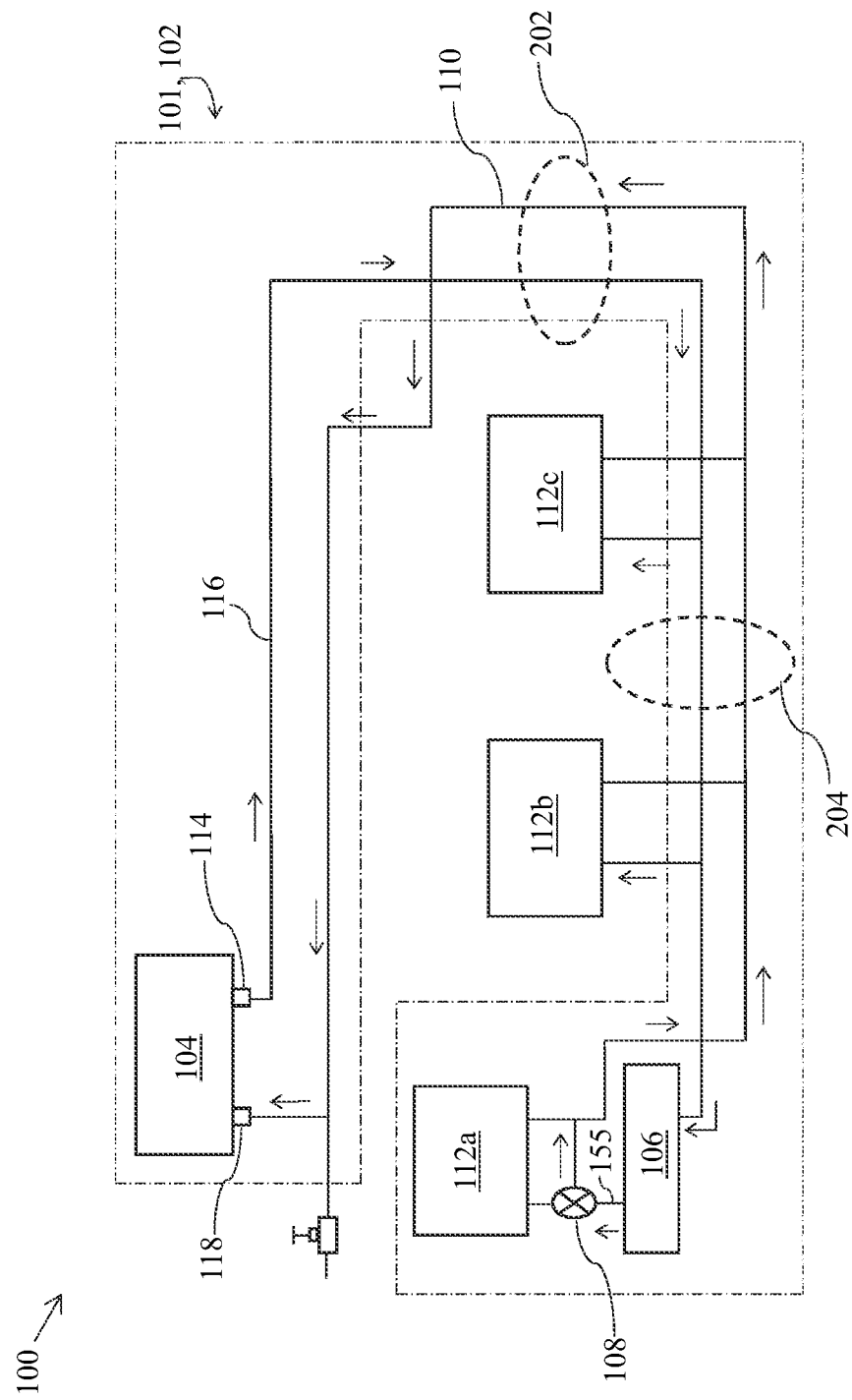
FIG. 2 illustrates a schematic view of the example instant hot water delivery system of FIG. 1 in a recirculation mode of operation, in accordance with example embodiments of the present disclosure.

Referring to FIGS. 1-2, a water supply system 100 may include an example instant hot water delivery system 101 that is disposed therein for instant delivery of hot water to a point of demand 112a in the water supply system 100 that is configured for instant hot water delivery. Hereinafter, the term 'point of demand' may be referred to as a hot water dispensing appliance without departing from a broader scope of the present disclosure. Further, hereinafter, a hot water dispensing appliance that is configured for instant hot water delivery, such as hot water dispensing appliance 112a may be referred to as an instant hot water dispensing appliance without departing from a broader scope of the present disclosure.

The instant hot water delivery system 101 may include an integrated recirculation loop 102 that is configured to ensure that hot water is instantly available at the instant hot water dispensing appliance 112a at any given time. The integrated recirculation loop 102 may include a water heater 104 that is configured to heat water that is received therein from its initial temperature to a set point temperature. In other words, the water heater 104 is configured to generate hot water. The water heater 104 may include a cold water inlet 118 that is configured to receive cold water via a cold water supply conduit 110, and a hot water outlet 114 that is configured to output hot water from the water heater 104 via a hot water supply conduit 116. The cold water supply conduit 110 and the hot water supply conduit 116 may be configured to distribute cold water and hot water, respectively, to the different hot water dispensing appliances 112a-c of the water supply system 100. The cold water supply conduit 110 may also be configured to receive and supply cooled down hot water from a thermal storage bin 106 of the instant hot water supply system back to the cold water inlet 118 of the water heater 104 during a recirculation of the cooled down hot water (shown in FIGS. 2 and 3) which will be described further below in greater detail. In one example embodiment, the cold water supply conduit 110 and the hot water supply conduit 116 may be insulated, however, in other example embodiments, the cold water supply conduit 110 and the hot water supply conduit 116 may not be insulated.

In addition to the water heater 104, the integrated recirculation loop 102 may include the thermal storage bin 106 that is configured to receive hot water from the water heater 104, store the hot water, and deliver the hot water instantly to the instant hot water dispensing appliance 112a. As illustrated in FIGS. 1-2, the hot water supply conduit 116 may be coupled to the instant hot water dispensing appliance 112a via the thermal storage bin 106 that is disposed adjacent the appliance 112a. The thermal storage bin 106 may be coupled to the water heater 104 such that the thermal storage bin 106 forms a closed loop with the water heater 104. As illustrated in FIGS. 1-2, the closed loop may be defined by the hot water supply conduit 116 that couples the thermal storage bin 106 to the hot water outlet 114 of the water heater 104, and a crossover valve 108 that couples the thermal storage bin 106 to the cold water inlet 118 of the water heater 104 via the cold water supply conduit 110.

In one example embodiment, the crossover valve 108 may be a three port self-regulating thermostatic valve that may be mechanically operated. The crossover valve 108 may comprise an input port 120, a first output port 122, and a second output port 124. The input port 120 of the crossover valve 108 may be coupled to the thermal storage bin 106, the first output port 122 of the crossover valve 108 may be coupled to the appliance 112a, and the second output port 124 of the crossover valve 108 may be coupled to the cold water inlet 118 of the water heater 104 via the cold water supply conduit 110. The crossover valve 108 may be configured to regulate or control a recirculation of the hot water from the thermal storage bin 106 to the cold water inlet 118 of the water heater 104 via the cold water supply conduit 110 based on a temperature of the hot water stored in the thermal storage bin 106. In other example embodiments, the crossover valve 108 may include any other appropriate mechanically operated valves that are configured to regulate a flow of the hot water from the thermal storage bin 106 to the water heater 104 via the cold water supply conduit 110 based on a temperature of the hot water stored in the thermal storage bin 106.

As illustrated in FIG. 1, when there is a demand for hot water at the instant hot water dispensing appliance 112a and the temperature of the hot water stored in the thermal storage bin 106 is above a threshold temperature, the crossover valve 108 may be configured to direct the flow of hot water from the thermal storage bin 106 to the instant hot water dispensing appliance 112a. However, as illustrated in FIG. 2, when the hot water stored in the thermal storage bin 106 drops below a threshold temperature, the crossover valve 108 may be configured to recirculate the cooled down hot water from the thermal storage bin 106 to the water heater 104 via the cold water supply conduit 110 of the closed loop.

Further, fresh hot water is drawn into the thermal storage bin 106 from the water heater 104 via the closed loop. Said recirculation ensures that the thermal storage bin 106 always has hot water available for instant delivery to the instant hot water dispensing appliance 112a at any given time.

If the cooled down hot water that reaches the water heater 104 reduces a temperature of the water stored in the water heater 104 (e.g., in a storage tank water heater) or if the temperature of the cooled down hot water that reaches the water heater 104 (e.g., in a tankless water heater) is below a set point temperature of the water heater 104, a controller (not shown) of the water heater 104 may be configured to activate a heating operation of the water heater 104 to heat the water to the set point temperature. That is, the heating operation of the water heater 104 may be controlled based on the temperature of the water stored in the water heater 104. However, in some example embodiments, as illustrated in FIG. 3, the integrated recirculation loop 102 may additionally include a temperature switch 302, a wireless transmitter 304, and a wireless receiver 306 that are configured to operate in concert to control the heating operation of the water heater 104 based on the temperature of the hot water stored in the thermal storage bin 106 and based on an operation of the crossover valve 108.

Figure 3:
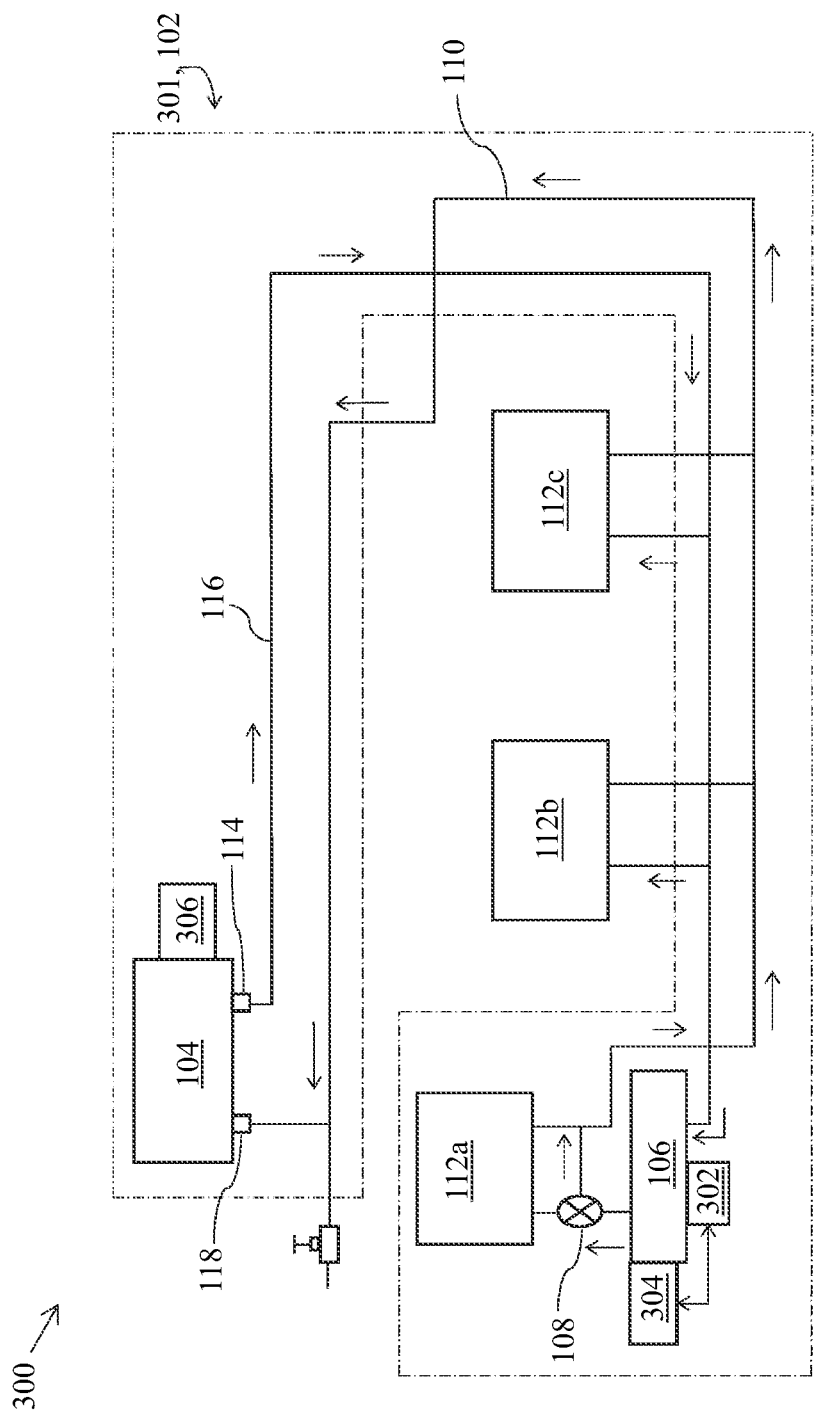
FIG. 3 illustrates a schematic view of another example instant hot water delivery system in the recirculation mode of operation, in accordance with example embodiments of the present disclosure.
Figure 6:
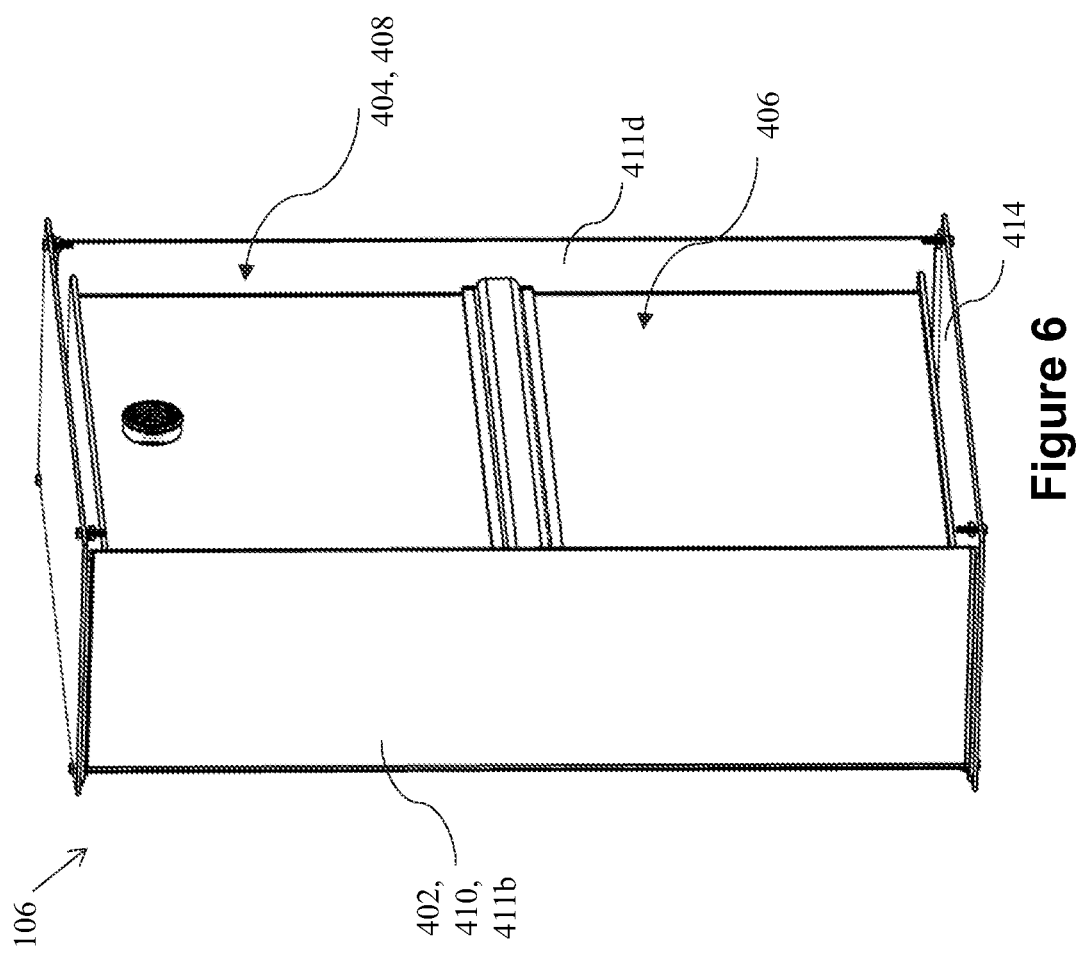
FIG. 6 is a perspective view of the example thermal storage bin of FIGS. 4 and 5 with a portion of the example outer container thereof being removed to illustrate an example inner container of the thermal storage bin, in accordance with example embodiments of the present disclosure.

In the example embodiment illustrated in FIG. 3, the temperature switch 302 and the wireless transmitter 304 are disposed at the thermal storage bin 106, and the wireless receiver 306 is disposed at the water heater 104. The temperature switch 302, the wireless transmitter 304, and the wireless receiver 306 may be battery powered, thereby requiring no electrical power from an external power supply source. In another example embodiment, the temperature switch 302 may be mechanically activated. In some example embodiments, the temperature switch 302 and the wireless transmitter 304 may be integrated into one unit, e.g., a wireless temperature sensor with wireless transmission capability. In other example embodiments, the wireless transmitter 304 and the wireless receiver 306 may be replaced with a wireless transceiver that has both wireless transmission and receiving capabilities.

The temperature switch 302 may be coupled to the thermal storage bin 106 and/or the crossover valve 108, and the wireless transmitter 304 may be coupled to the temperature switch 302. Further, the wireless receiver 306 may be coupled to the water heater 104 (e.g., a controller of the water heater 104). The temperature switch 302 may be configured to determine the temperature of the hot water stored in the thermal storage bin 106 (e.g., from the thermal storage bin 106 or the crossover valve 108) and generate a temperature signal when the temperature of the hot water in the thermal storage bin 106 falls below the threshold temperature. The temperature signal may be transmitted to the wireless transmitter 304 which in turn generates and wirelessly transmits a valve open signal to the wireless receiver 306 using any appropriate wireless communication protocol and/or standard. Upon receiving the valve open signal, the wireless receiver 306 may operate in concert with the controller of the water heater 104 to control the heating operation of the water heater 104. Controlling the heating operation of the water heater 104 may include, but is not limited to, activating or initiating a heating cycle, increasing a rate of heating of the water in the water heater 104, etc. In one example, upon receiving the valve open signal, the burner of the water heater may be fired up from 5% to 50% rate (e.g., fuel fired water heater). Similarly, when the temperature of the hot water that is stored in the thermal storage bin is greater than or equal to the threshold temperature, a corresponding signal may be sent to the wireless receiver 306 to turn down the burner of the water heater 104 or stop the heating cycle of the water heater 104.

Even though the present disclosure describes the thermal storage bin 106 as being disposed adjacent the instant hot water dispensing appliance 112a and being configured to supply instant hot water only to the instant hot water dispensing appliance 112a, one of skill in the art can understand and appreciate that in other example embodiments, a single thermal storage bin 106 may be configured to supply instant hot water to multiple appliances without departing from a broader scope of the present disclosure. In said other example embodiments, a larger thermal storage bin having a larger capacity (e.g., hot water storage capacity) may be used. Further, in said example embodiments, the thermal storage bin 106 may be disposed at any other appropriate location within the water supply system 100 that allows the recirculation of the cooled down hot water from the thermal storage bin 106 to the water heater 104 via the cold water supply conduit 110 and allows hot water to be delivered instantly to one or more appliances served by the thermal storage bin 106. For example, the thermal storage bin 106 and/or the crossover valve 108 may be disposed at locations A or B (202, 204) as illustrated in FIG. 2. In another example embodiment, the thermal storage bin 106 may be integrated with the appliance 112a. In yet another example embodiment such as in a shower, the thermal storage bin 106 may be configured to be disposed in a wall behind the shower or the thermal storage bin 106 may be concealed as a shower caddy. In said another example embodiment, the thermal storage bin 106 may be designed to be attached to the shower head. The above described design and configuration examples of the thermal storage bin 106 are not limiting and other design or configurations are within the broader scope of the present disclosure.

The thermal storage bin 106 of the instant hot water delivery system 101 may be configured to reduce the dissipation of heat from the hot water stored therein. In other words, the thermal storage bin 106 may be configured to retain a thermal energy of the hot water for prolonged periods to reduce the number of recirculation instances, thereby increasing the efficiency of the instant hot water delivery system 101. The thermal storage bin 106 will be described in greater detail in the following paragraphs in association with FIGS. 4-10.

Turning to FIGS. 4-10, the thermal storage bin 106 may include an outer container 402 that defines an inner cavity 404. Further, the thermal storage bin 106 may include an inner container 406 that is disposed within the inner cavity 404 such that a space 408 is formed between the outer container 402 and the inner container 406. The space 408 between the inner container 406 and the outer container 402 may be filled with an insulation material such that the insulation material surrounds the inner container 406 (except for the inlet and outlet (456, 458)). In one example, the space 408 may be filled with a foam insulation material such as rigid polyurethane foam, cyclopentane, etc. In another example, the space 408 may be filled with vacuum insulated panels. In yet another example, the space 408 may be void and not filled in with any insulation. That is, vacuum may be used to discharge air, thereby eliminating convective and conductive heat transfer. The examples for insulation that are provided above are not limiting, and in other embodiments, any other appropriate insulation that serves the purpose of local thermal storage and minimizing stand by losses from the thermal storage bin may be used without departing from a broader scope of the present disclosure.

The outer container 402 may include an outer side wall 410, an outer top wall 412, and an outer bottom wall 414 that are arranged such that they define the inner cavity 404. The outer side wall 410 may include a pair of outer major walls 411a and 411c that are disposed opposite to each other; and a pair of outer minor walls 411b and 411d that are disposed opposite to each other. The pair of outer major walls (411a, 411c) and the pair of outer minor walls (411b, 411d) are arranged such that they define the outer side wall 410 that is cuboid shaped (i.e., having a rectangular cross-section).

Further, as illustrated in FIGS. 4-5, the outer container 402 may include an inlet opening 416 that is formed in a first outer major wall 411a of the pair of outer major walls (411a, 411c), and an outlet opening 418 that is formed in the second outer major wall 411c of the pair of outer major walls (411a, 411c). The inlet opening 416 may be disposed adjacent the outer top wall 412 and the outlet opening 418 may be disposed adjacent the outer bottom wall 414. In other words, the inlet opening 416 and the outlet opening 418 of the outer container 402 are disposed at opposite ends of opposite major walls (411a, 411c) of the outer container 402. The inlet opening 416 may be configured to receive an end of the hot water supply conduit 116 therethrough, and the outlet opening 418 may be configured to receive an end of a valve connector conduit 155 (shown in FIG. 2) therethrough. The valve connector conduit 155 may be configured to couple the outlet 458 of the thermal storage bin 106 to the input port 120 of the crossover valve 108.

Even though the present disclosure describes the thermal storage bin 106 as having an outer container 402 and the inner container 406, one of skill in the art can understand and appreciate that in some example embodiments, the thermal storage bin 106 may not include the outer container 402. Instead, in said some example embodiments, the thermal storage bin 106 may include only the inner container 406 with the walls thereof being formed as a double walled structure that is filled with any appropriate insulation material, such as vacuum panels, foam, etc.

Similar to the outer container 402, as illustrated in FIGS. 7 and 8, the inner container 406 may include an inner side wall 710, an inner top wall 712, and an inner bottom wall 714 that are arranged such that they define the inner chamber 704. The inner side wall 710 may include a pair of inner major walls 711a and 711c that are disposed opposite to each other; and a pair of inner minor walls 711b and 711d that are disposed opposite to each other. The pair of inner major walls (711a, 711c) and the pair of inner minor walls (711b, 711d) are arranged such that they define the inner side wall 710 that is cuboid shaped (i.e., having a rectangular cross-section).

Further, the inner container 406 may include an inlet flange 716 that is formed in a first inner major wall 711a of the pair of inner major walls (711a, 711c), and an outlet flange 718 that is formed in the second outer major wall 711c of the pair of inner major walls (711a, 711c). The inlet flange 716 may be disposed adjacent the inner top wall 712 and the outlet flange 718 may be disposed adjacent the inner bottom wall 714. In one example embodiment, the inlet flange 716 and the outlet flange 718 may be threaded for easy coupling of the various conduits (e.g., hot water supply conduit 116 and the valve connector conduit 155) to the inlet 456 and the outlet 458 of the thermal storage bin 106. The inlet flange 716 may define an input opening 766, and the outlet flange 718 may define an output opening 768; where the input opening 766 and the output opening 768 are in fluid communication with the inner chamber 704. Further, the inner container 406 may include channel stiffeners 750 that are disposed on the inner side wall 710 to strengthen the inner container 406 and/or the flow channels 1004 (shown in FIG. 10) formed in the inner chamber 704 of the inner container 406. In other example embodiments, the inner container 406 may not include the channel stiffeners 750.

The inner container 406 may be disposed in the inner cavity 404 defined by the outer container 402 such that the input opening 766 defined by the inlet flange 716 of the inner container 406 is axially aligned with the inlet opening 416 of the outer container 402 to define the inlet 456 of the thermal storage bin 106, and the output opening 768 defined by the outlet flange 718 of the inner container 406 is axially aligned with the outlet opening 418 of the outer container 402 to define the outlet 458 of the thermal storage bin 106. The hot water supply conduit 116 that is received through the inlet opening 416 may be coupled to the inlet flange 716 to receive hot water from the water heater 104 at the inlet 456 of the thermal storage bin. Similarly, the valve connector conduit 155 that is received through the outlet opening 418 may be coupled to the outlet flange 718 to output either hot water or cooled down hot water from the thermal storage bin 106 to the crossover valve 108 through the outlet 458 of the thermal storage bin 106.

Arranging the inlet 456 of the thermal storage bin 106 adjacent the top portion and the outlet adjacent the bottom portion of the thermal storage bin 106 creates a gravity based flow system that relies on natural thermosiphon based circulation where the hot water that enters the thermal storage bin 106 through the inlet 456 rises to the top and the cold water that has higher specific gravity (density) sinks to the bottom. However, one of skill in the art can understand and appreciate that in other example embodiments, the inlet 456 and the outlet 458 of the thermal storage bin 106 may be formed at any other portion of the thermal storage bin without departing from a broader scope of the present disclosure, provided that said arrangement of the inlet and outlet does not significantly affect a thermosiphon based circulation of the water through the thermal storage bin 106.

Figure 10:
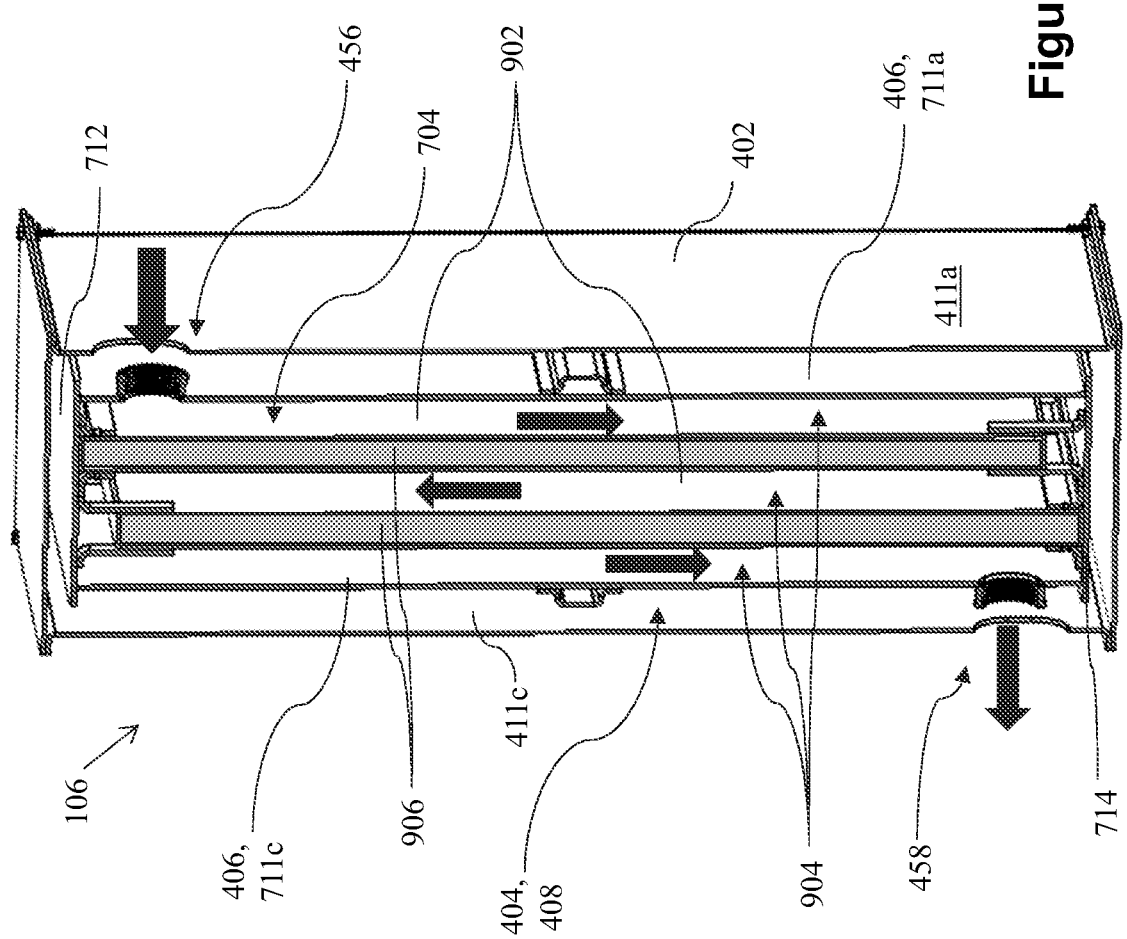
FIG. 10 illustrates a cross-section view of the example thermal storage bin, in accordance with example embodiments of the present disclosure.

The inner chamber 704 defined by the inner container 406 may be insulated by the insulation material disposed in the space 408 around the inner container 406. Further, the inner chamber 704 may include a plurality of heat exchanger panels 902 that are disposed therein such that they define multiple flow channels 904, where adjacent flow channels 904 are in fluid communication with each other each other. For example, as illustrated in FIG. 10, the inner chamber 704 may include two heat exchanger panels 902 that defines three flow channels 904 between the inlet 456 and the outlet 458 of the thermal storage bin 106. Each flow channel 904 may correspond to a pass that the hot water entering the thermal storage bin 106 must make before reaching the outlet 458 of the thermal storage bin 106. In the example embodiment illustrated in FIG. 10, the hot water entering the thermal storage bin 106 must make three passes before reaching the outlet 458 thereof. The heat exchanger panels 902 may be arranged such that the flow of the water takes a 180° turn at every pass and the flow in the adjacent flow channels 904 may be in opposite directions. Further, the heat exchanger panels 902 may be arranged such that at least a major surface 904a of at least one heat exchanger panel 902 defines a portion of the flow channel 904, thereby allowing heat exchanger with the heat exchanger panels 902 when the hot water flows through the flow channels 904. In other words, the heat exchanger panels 902 may be configured such that the thermal storage bin 106 operates as a multi-pass heat exchanger unit.

Figure 9:
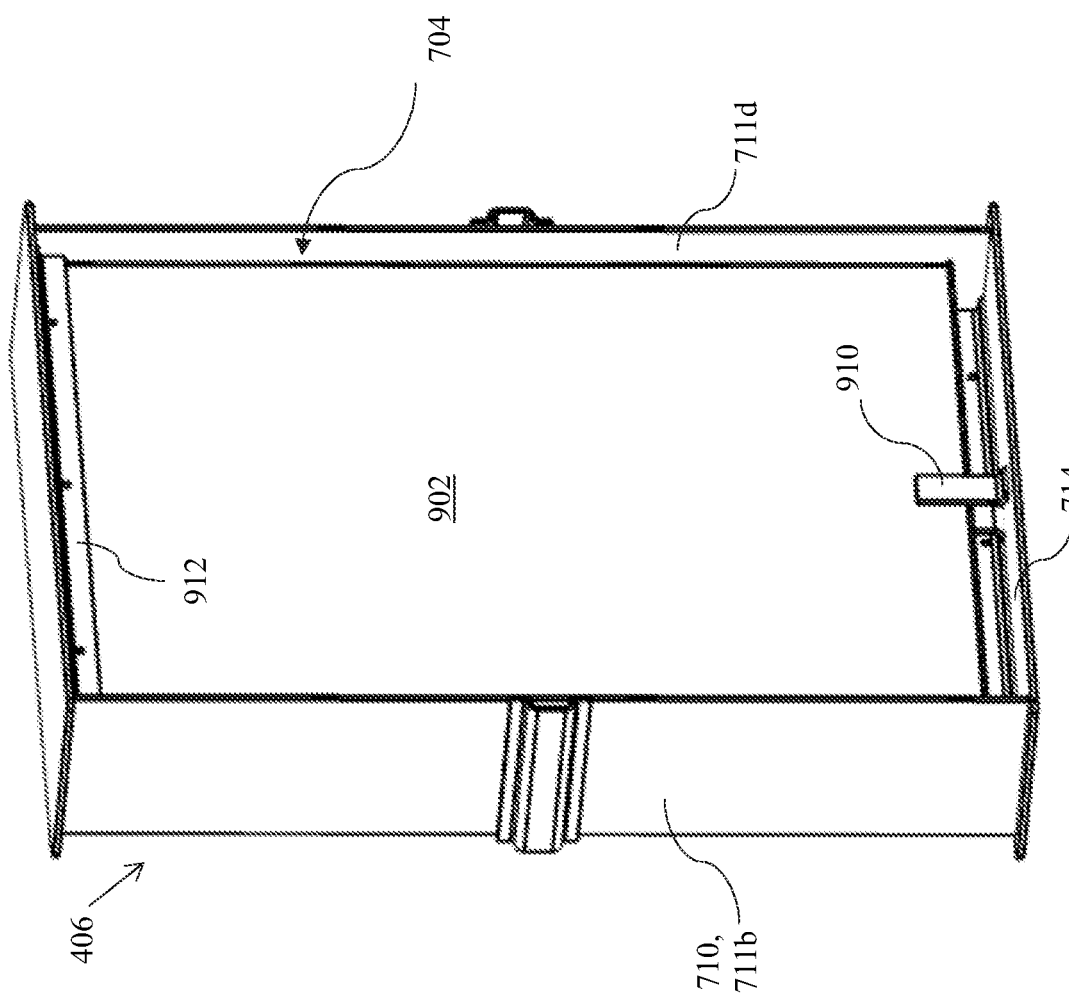
FIG. 9 is a perspective view of the example inner container of the thermal storage bin with a portion of the example inner container being removed to illustrate an example inner chamber of the example inner container and an example heat exchanger panel disposed in the example inner chamber, in accordance with example embodiments of the present disclosure.

In particular, the heat exchanger panels 902 may be coupled to the inner top wall 712 and/or the inner bottom wall 714 of the inner container 406 using brackets (910, 912) (shown in FIGS. 9 and 10). The heat exchanger panels 902 may be arranged in the inner chamber 704 such that they are substantially perpendicular to the inner top wall 712 and the inner bottom wall 714; and are substantially parallel to the pair of inner major walls (711a, 711c) of the inner container 406. However, in other example embodiments, the heat exchanger panels 902 may be arranged in any other appropriate manner that creates the flow channels and does not significantly affect the thermosiphon based circulation of hot water through the thermal storage bin 106.

Even though the present disclosure describes heat exchanger panels that are configured as plate heat exchangers, one of skill in the art can understand and appreciate that in other example embodiments, the heat exchanger panels may be coil type phase change material containers without departing from a broader scope of the present disclosure.

The multiple flow channels 904 and/or the multiple passes that are formed in the inner chamber 704 may be configured to promote heat exchanger between the hot water and the phase change material 906 as the hot water flows from the inlet 456 to the outlet 458 of the thermal storage bin 106. Further, the multiple flow channels 904 are configured to provide an isolation or a partition between the water flowing into the thermal storage bin 106 via the inlet 456 and the water that is stored in inner chamber 704 of the thermal storage bin 106. Said isolation or partition is particularly beneficial when hot water that has cooled down in the hot water supply conduit 116 enters the thermal storage bin to replace the hot water that has been displaced therefrom because of recirculation. In said scenario, if the inner chamber 704 did not have any heat exchanger panels 902 and flow channels 904, the cooled down water entering the inner chamber 704 from the hot water supply conduit 116 may quickly cool down the remaining hot water in the inner chamber 704. However, the heat exchanger panels 902 and flow channels 904, provides an isolation between the cold water entering the inner chamber 704 and the hot water that is still left in the inner chamber 704. For example, the flow channels 904 that are closer to the outlet 458 of the thermal storage bin 106 may have the hot water and the flow channels 904 that are closer to the inlet 456 may have the cold water that sinks to the bottom of the flow channel 904. Thus, the flow channels 904 defined by the heat exchanger panels 902 may slow down the cooling of the hot water stored in the thermal storage bin 106, which further improves efficiency of the thermal storage bin 106.

Each heat exchanger panel 902 may be filled with a phase change material 906 such that the heat exchanger panel 902 encapsulates a phase change material 906 therein. Alternatively, in other example embodiments, the heat exchanger panels 902 may be filled with any other appropriate latent heat storage material without departing from a broader scope of the present disclosure. The heat exchanger panels 902 may be formed using material that allows good heat exchanger between the hot water flowing external to the heat exchanger panel 902 and the phase change material 906 disposed in the heat exchanger panel 902, while preventing any leaks or any damage to the phase change material 902.

The combination of the insulation in the space 408 surrounding the inner container 406 and the phase change material 906 disposed in the inner chamber 704 of the inner container 406 may allow a thermal energy of the hot water stored in the thermal storage bin 106 to be retained for a prolonged period. For example, the outer insulation and the phase change material 906 may keep the water in the inner chamber 704 of the thermal storage bin 106 hot for up to 8-9 hours.

In some example embodiments, the thermal storage bin 106 may not include the heat exchanger panels 902 with the phase change materials 906. Instead, in said example embodiments, the thermal storage bin 106 may only include the outer insulation in the space 408 between the outer container 402 and the inner container 406 depending on the thermal storage requirements of the instant hot water delivery system 101 and/or the performance of the outer insulation. In some other example embodiments, phase change material 906 may be disposed in the space 408 between the inner container 406 and the outer container 402 for insulation.

In one example embodiment, the thermal storage bin 106 may be configured to store 3 gallons of hot water; however, in other example embodiments, the thermal storage bin 106 may be larger or smaller in size and may be configured to store less than or more than 3 gallons of hot water. In one example, the thermal storage bin 106 may be a 50% water and 50% pcm storage bin, the dimensions being 8×6×14 inches which provides approximately a 3 gallon storage space. However, in other examples, the thermal storage bin 106 may be larger or smaller depending on the volume of water that needs to be stored therein and/or the application.

Even though the present disclosure describes that the thermal storage bin 106 comprises two heat exchanger panels 902 that define three flow channels 904, one of skill in the art can understand and appreciate that in other example embodiments, the thermal storage bin may include fewer or more heat exchanger panels 902 (at least one) and flow channels without departing from a broader scope of the present disclosure. Further, even though the present disclosure describes a thermal storage bin 106 that is substantially cuboid shaped, i.e., having a rectangular cross-section, one of skill in the art can understand and appreciate that in other example embodiments, the thermal storage bin 106 may have any other appropriate shape without departing from a broader scope of the present disclosure. For example, the thermal storage bin 106 may be substantially cylindrical in shape, i.e., with a circular cross-section. However, compared to the cylindrical shape, the cuboid shape of the thermal storage bin 106 as illustrated in FIGS. 4-10 may provide wider passage for the water in each pass for better heat exchanger and may minimize local pressure losses which in turn improves the thermosiphon circulation.

An operation of the instant hot water delivery system 101 will be described below in greater detail in association with FIGS. 11 and 12 by referring to FIGS. 1-3 which illustrates the different instant hot water delivery systems. Reference will also be made to FIGS. 4-10 as needed. Although specific operations are disclosed in the flowcharts illustrated in FIGS. 11 and 12, such operations are only non-limiting examples. That is, embodiments of the present invention are well suited to performing various other operations or variations of the operations recited in the flowchart. It is appreciated that the operations in the flowcharts illustrated in FIGS. 11 and 12 may be performed in an order different than presented, and that not all the operations in the flowchart may be performed.

Figure 11:
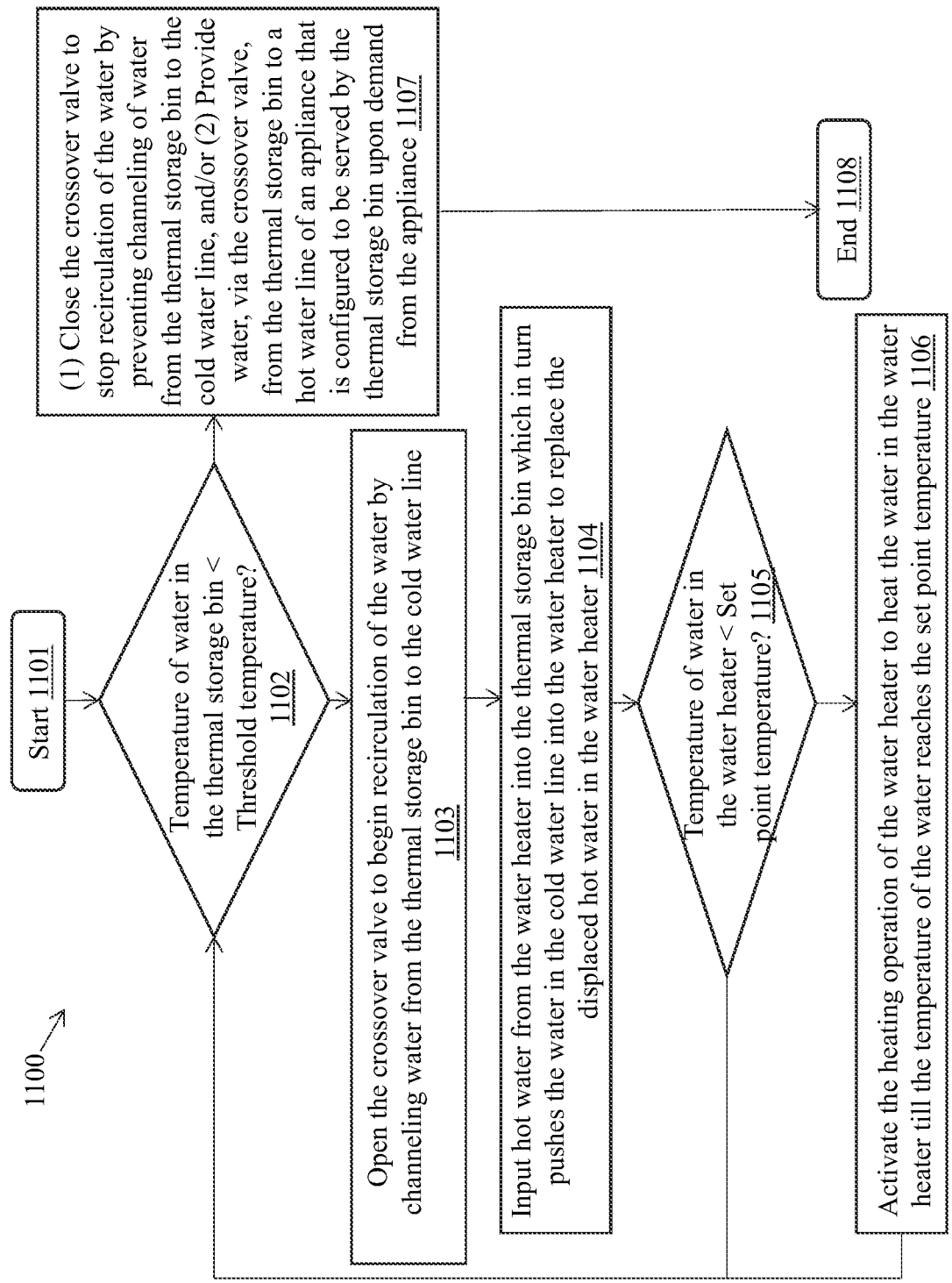
FIG. 11 is a flowchart that illustrates an example operation of the example hot water delivery system of FIGS. 1 and 2, in accordance with example embodiments of the present disclosure.

Referring to FIG. 11, an example process 1100 of the instant hot water delivery system 101 illustrated in FIGS. 1 and 2 begins at operation 1101 and proceeds to operation 1102 where the crossover valve 108 determines if the temperature of the hot water stored in thermal storage bin 106 is less than a threshold temperature. In other words, in operation 1102, the crossover valve 108 may determine if the hot water stored in the thermal storage bin 106 has cooled down below a threshold temperature. Said temperature determination may be made by the crossover valve 108 when the hot water stored in the thermal storage bin reaches the input port 120 of the crossover valve 108 in response to a demand for hot water at the instant hot water dispensing appliance 112a, for example. The crossover valve may be a self-regulating thermostatic valve that is set to the threshold temperature.

If the temperature of the hot water stored in the thermal storage bin 106 is greater than or equal to the threshold temperature, in operation 1107, the crossover valve 108 operates such that the second output port 124 is closed to prevent a recirculation of the hot water from the thermal storage bin 106 to the water heater 104 via the cold water supply conduit 110. Further, the first output port 122 of the crossover valve 108 is opened to direct the hot water from the thermal storage bin 106 towards the instant hot water dispensing appliance 112a to meet a demand thereof. The process 1100 ends at operation 1108 when the demand for the hot water at the instant hot water dispensing appliance 112a has been met. In operation 1108, when the hot water demand of the instant hot water dispensing appliance 112a has been met, the crossover valve 108 may close both the first and second output ports (122, 124).

However, if the temperature of the hot water stored in the thermal storage bin 106 is less than the threshold temperature, in operation 1103, the crossover valve 108 operates such that the first output port 122 to the instant hot water dispensing appliance 112a is closed, and the second output port 124 is opened to automatically recirculate the cooled down hot water from the thermal storage bin 106 to the water heater 104 via the cold water supply conduit 110 based on a thermosiphon flow mechanism. Further, in operation 1104, fresh hot water from the water heater 104 rises to the thermal storage bin 106 via the hot water supply conduit 116 to replace the cooled down hot water that is displaced from the thermal storage bin 106.

In operation 1105, a controller of the water heater 104 may determine if the temperature of the water in the water heater 104 or the temperature of the cooled down hot water that is recirculated to the water heater 104 is less than a set point temperature of the water heater 104. If the temperature of the water in the water heater 104 or the temperature of the cooled down hot water that is recirculated to the water heater 104 is less than the set point temperature, then, in operation 1106, a heating operation of the water heater 104 is activated to heat the water to the set point temperature. Then, the process 1100 returns to operation 1102. Also, if the temperature of the water in the water heater 104 or the temperature of the cooled down hot water that is recirculated to the water heater 104 is greater than or equal to the set point temperature, the process 1100 returns to operation 1102. In other words, the recirculation of the cooled down hot water from the thermal storage bin 106 to the water heater 104 and the supply of fresh hot water to the thermal storage bin 106 continues till the temperature of the hot water stored in the thermal storage bin 106 is greater than or equal to the threshold temperature.

In one example, the set point temperature of the water heater may be 120° F., the threshold temperature may be 100° F., and the melting point temperature of the phase change material 906 in the thermal storage bin 106 may be 110° F. In said example, hot water at 120° F. may rise from the water heater 104 to the thermal storage bin 106. The hot water is stored in the thermal storage bin 106. The hot water stored in the thermal storage bin 106 may be maintained at or about 110° F. based on the melting point temperature of the phase change material 906 in the thermal storage bin 106. When there is a demand for hot water at the instant hot water dispensing appliance 112a, the hot water at approximately 110° F. may reach the crossover valve 108. Since the temperature of the hot water is above the 100° F. threshold temperature to which the crossover valve 108 is set, the crossover valve 108 may deliver the hot water instantly to the instant hot water dispensing appliance 112a. However, if the temperature of the hot water that reaches the crossover valve 108 from the thermal storage bin 106 is less than 100° F., the crossover valve 106 may initiate a recirculation process, where the cooled down hot water from the thermal storage bin 106 is recirculated to the water heater 104 via the cold water supply conduit 110 through a thermosiphon circulation mechanism. Furthermore, the 120° F. hot water may rise from the water heater 104 to the thermal storage bin 106 to replace the displaced cooled down hot water. The recirculation will continue till the temperature of the hot water that reaches the crossover valve 108 from the thermal storage bin 106 is greater than or equal to 100° F. It is noted that the example temperatures provided above are not limiting and that any other temperature values may be used without departing from a broader scope of the present disclosure.

Figure 12:
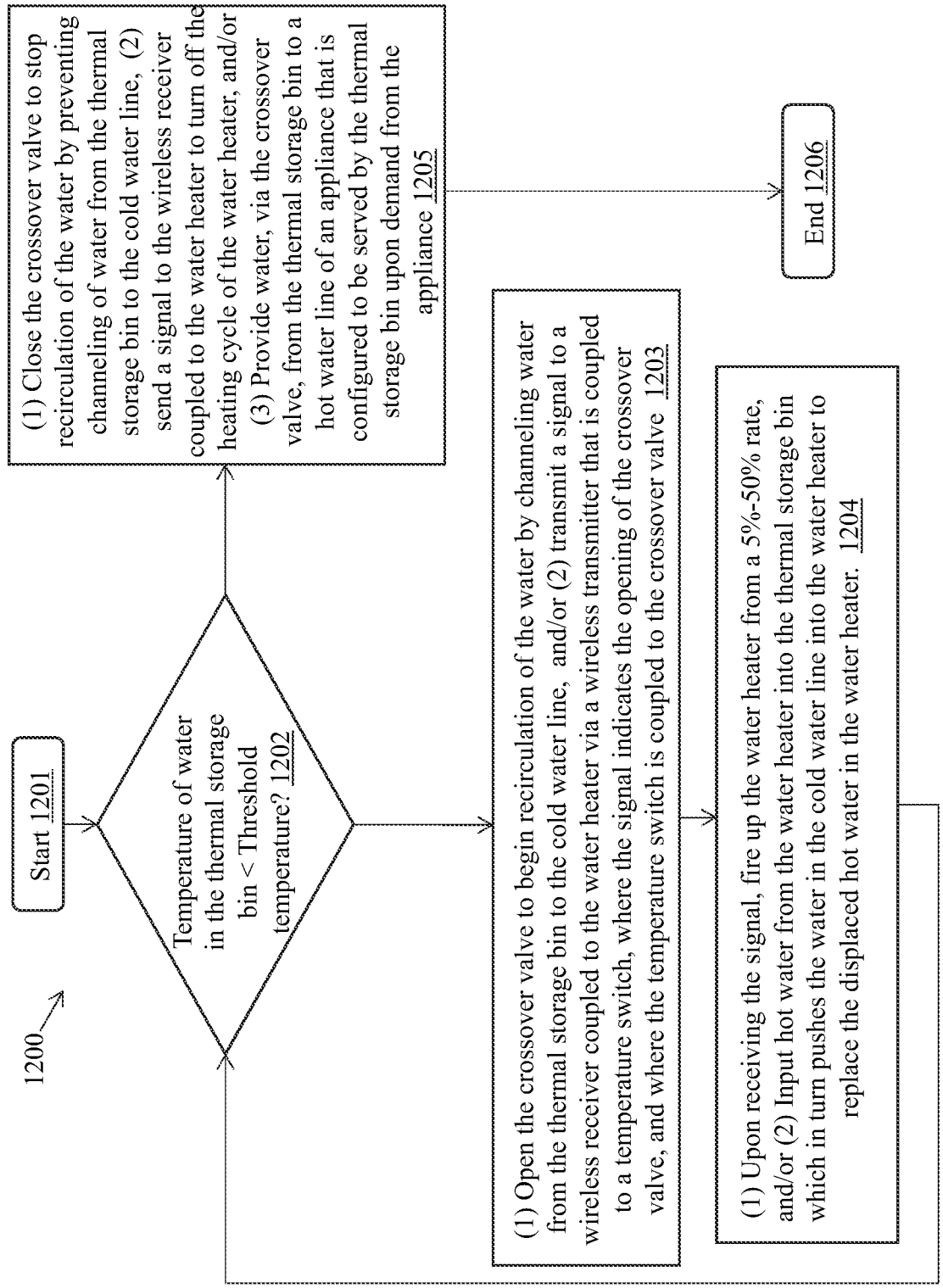
FIG. 12 is a flowchart that illustrates an example operation of the other example hot water delivery system of FIG. 3, in accordance with example embodiments of the present disclosure.

Referring to FIG. 12, an example process 1200 of the instant hot water delivery system 301 illustrated in FIG. 3 begins at operation 1201 and proceeds to operation 1202 where the crossover valve 108 determines if the temperature of the hot water stored in thermal storage bin 106 is less than a threshold temperature. The instant hot water delivery system 301 of FIG. 3 may be substantially similar to the instant hot water delivery system 101 of FIGS. 1-2 except for the addition of the temperature switch 302, the wireless transmitter 304, and the wireless receiver 306 that operate in concert to control a heating operation of the water heater 104 based on the temperature of the hot water stored in the thermal storage bin 106 and/or the operation of the crossover valve 108.

In operation 1202, if the temperature of the hot water stored in the thermal storage bin 106 is less than the threshold temperature, the process 1200 proceeds to operation 1203. In operation 1203, the crossover valve 108 closes the first output port 122 to the instant hot water dispensing appliance 112a, and opens the second output port 124 to automatically recirculate the cooled down hot water from the thermal storage bin 106 to the water heater 104 via the cold water supply conduit 110 based on a thermosiphon flow mechanism. Further, in operation 1203, the temperature switch 302 and the wireless transmitter 304 operate in concert to generate and send a valve open signal to the wireless receiver 306 at the water heater 104.

Responsive to receiving the valve open signal, in operation 1204, the wireless receiver 306 operates in concert with the controller of the water heater 104 to control a heating operation of the water heater 104. For example, a heating cycle of the water heater may be initiated, a rate of heating of the water (e.g., a firing rate for a fuel fired water heater) may be increased. Further, in operation 1204, fresh hot water from the water heater 104 rises to the thermal storage bin 106 via the hot water supply conduit 116 to replace the cooled down hot water that is displaced from the thermal storage bin 106. The recirculation stops when the temperature of the hot water stored in thermal storage bin 106 is greater than or equal to the threshold temperature.

However, in operation 1202, if the temperature of the hot water stored in the thermal storage bin 106 is greater than or equal to the threshold temperature, the process 1200 proceeds to operation 1205. In operation 1205, the crossover valve 108 closes the second output port 124 to prevent a recirculation of the hot water to the water heater 104 via the cold water supply conduit 110. Further, the first output port 122 is opened to direct a flow of the hot water towards the instant hot water dispensing appliance 112*a* if there is a demand for hot water at the instant hot water dispensing appliance 112*a*.

Furthermore, in operation 1205, a temperature switch 302 that is coupled to the thermal storage bin 106 and/or the crossover valve 108 operates in concert with the wireless transmitter 304 to generate and transmit a valve close signal to the wireless receiver 306 indicating the second output port 124 of the crossover valve 108 is closed to prevent recirculation. Upon receiving the valve close signal, a controller of the water heater 104 may either switch off a heating cycle of the water heater 104 or reduce a rate of heating to a default rate provided that the rate was increased, or the heating cycle was initiated responsive to the recirculation.

Even though the present disclosure describes an instant hot water delivery system 101 (or 301) that does not need any electrical power for operation, one of skill in the art can understand appreciate that in some example embodiments, the instant hot water delivery system may be configured to use electrical power. For example, in one example embodiment, the phase change material in the thermal storage bin 106 may be configured to be charged using a low voltage, low amperage electrical power. In said example embodiment, the instant hot water delivery system may not require a crossover valve for recirculation of water because as the water stored in the thermal storage bin 106 begins to cool down, the phase change material may be charged using a low voltage, low amperage electrical power to keep the water hot. That is, in said example embodiment, the instant hot water delivery system may include a resistive heated phase change material without recirculation to deliver instant hot water without departing from a broader scope of the present disclosure.

Although the disclosures provides example embodiments, it should be appreciated by those skilled in the art that various modifications are well within the scope of the disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

The invention claimed is:

1. An instant hot water delivery system comprising:
a thermal storage bin that defines an inner chamber that is configured to store hot water therein, the thermal storage bin comprising:
an inlet that is fluidly coupled to a hot water outlet of a water heater;
an outlet; and
a heat exchanger panel that is disposed in the inner chamber such the heat exchanger panel defines flow channels within the inner chamber, the heat exchanger panel comprising a phase change material that is encapsulated therein; and
a crossover valve that is configured to recirculate the hot water from the thermal storage bin to the water heater via a cold water supply conduit based on a temperature of the hot water stored in the thermal storage bin, the crossover valve comprising:
an input port that is fluidly coupled to the outlet of the thermal storage bin;
a first output port that is fluidly coupled to a water dispensing appliance;
a second output port that is fluidly coupled to the cold water supply conduit, the cold water supply conduit being fluidly coupled to a cold water inlet of the water heater and the water dispensing appliance; and
a wireless transmitter configured to transmit a valve open signal to a wireless receiver that is coupled to the water heater when the temperature of the hot water in the thermal storage bin drops below the threshold temperature, the valve open signal representing of a state of the crossover valve where the water from the thermal storage bin is recirculated to the cold water inlet of the water heater via the cold water conduit, wherein the wireless receiver is configured to control a heating operation of the water heater upon receiving the valve open signal from the wireless transmitter,
wherein:
when the hot water stored in the thermal storage bin cools to a temperature lower than a threshold temperature, the crossover valve is configured to close the first output port and open the second output port to recirculate the hot water that has cooled down from the thermal storage bin to the cold water inlet of the water heater via the cold water conduit, and
when the temperature of the hot water stored in the thermal storage bin is greater than or equal to the threshold temperature, the crossover valve is configured to close the second output port and open the first output port to direct a flow of the hot water from the thermal storage bin to the water dispensing appliance responsive to a demand for the hot water.

2. The instant hot water delivery system of claim 1, wherein the crossover valve is a mechanically operated thermostatic valve.

3. The instant hot water delivery system of claim 1, wherein the recirculation of the hot water from the thermal storage bin to the water heater via the cold water conduit is based on thermosiphon.

4. The instant hot water delivery system of claim 1, further comprising a temperature switch that is coupled to the thermal storage bin, the crossover valve, and the wireless transmitter, wherein the temperature switch is configured to send a temperature signal to the wireless transmitter when the temperature of the hot water in the thermal storage bin drops below the threshold temperature.

5. The instant hot water delivery system of claim 1, wherein the water dispensing appliance includes a faucet.

6. An instant hot water delivery system comprising:
a thermal storage bin that is disposed adjacent to a water dispensing appliance and configured to deliver hot water instantly to the water dispensing appliance responsive to a demand for the hot water, the thermal storage bin comprising:
an insulated inner chamber that is configured to receive hot water from a water heater and store the hot water therein;

a heat exchanger panel that is disposed in the insulated inner chamber, wherein the heat exchanger panel encapsulates a phase change material that is configured to minimize a heat dissipation of the hot water stored in the insulated inner chamber; and an inlet and an outlet that are in fluid communication with the insulated inner chamber, wherein the inlet is coupled to a hot water output of the water heater, and wherein the outlet is coupled to a crossover valve that is configured to:

(a) recirculate the hot water that is stored in the insulated inner chamber to the water heater via a cold water supply conduit when the hot water cools to a temperature lower than a threshold temperature; and (b) deliver the hot water to the water dispensing appliance when a temperature of the hot water is greater than or equal to the threshold temperature and responsive to the demand for the hot water from the water dispensing appliance; and a wireless transmitter configured to transmit a valve open signal to a wireless receiver that is coupled to the water heater when the temperature of the hot water in the thermal storage bin drops below the threshold temperature, the valve open signal representing of a state of the crossover valve where the water from the thermal storage bin is recirculated to a cold water inlet of the water heater via the cold water conduit, wherein the wireless receiver is configured to control a heating operation of the water heater upon receiving the valve open signal from the wireless transmitter, wherein:

when the hot water stored in the thermal storage bin cools to a temperature lower than a threshold temperature, the crossover valve is configured to close the first output port and open the second output port to recirculate the hot water that has cooled down from the thermal storage bin to the cold water inlet of the water heater via the cold water conduit, and when the temperature of the hot water stored in the thermal storage bin is greater than or equal to the threshold temperature, the crossover valve is configured to close the second output port and open the first output port to direct a flow of the hot water from the thermal storage bin to the water dispensing appliance responsive to a demand for the hot water.

7. The instant hot water delivery system of claim 6, wherein the crossover valve comprises:

an input port that is fluidly coupled to the outlet of the thermal storage bin;

the first output port that is fluidly coupled to the water dispensing appliance; and the second output port that is fluidly coupled to the cold water supply conduit, the cold water supply conduit being fluidly coupled to the cold water inlet of the water heater and the water dispensing appliance.

8. The instant hot water delivery system of claim 6, wherein the crossover valve is a self-regulating thermostatic valve.

9. The instant hot water delivery system of claim 6, wherein the water dispensing appliance includes a faucet.

10. The instant hot water delivery system of claim 6, wherein the recirculation of the hot water from the thermal storage bin to the water heater via the cold water conduit is based on thermosiphon.

11. The instant hot water delivery system of claim 6, further comprising a temperature switch that is coupled to the thermal storage bin, the crossover valve, and the wireless transmitter, wherein the temperature switch is configured to send a temperature signal to the wireless transmitter when the temperature of the hot water in the thermal storage bin drops below the threshold temperature.

\* \* \* \* \*